United States Patent Office 2,949,339
Patented Aug. 16, 1960

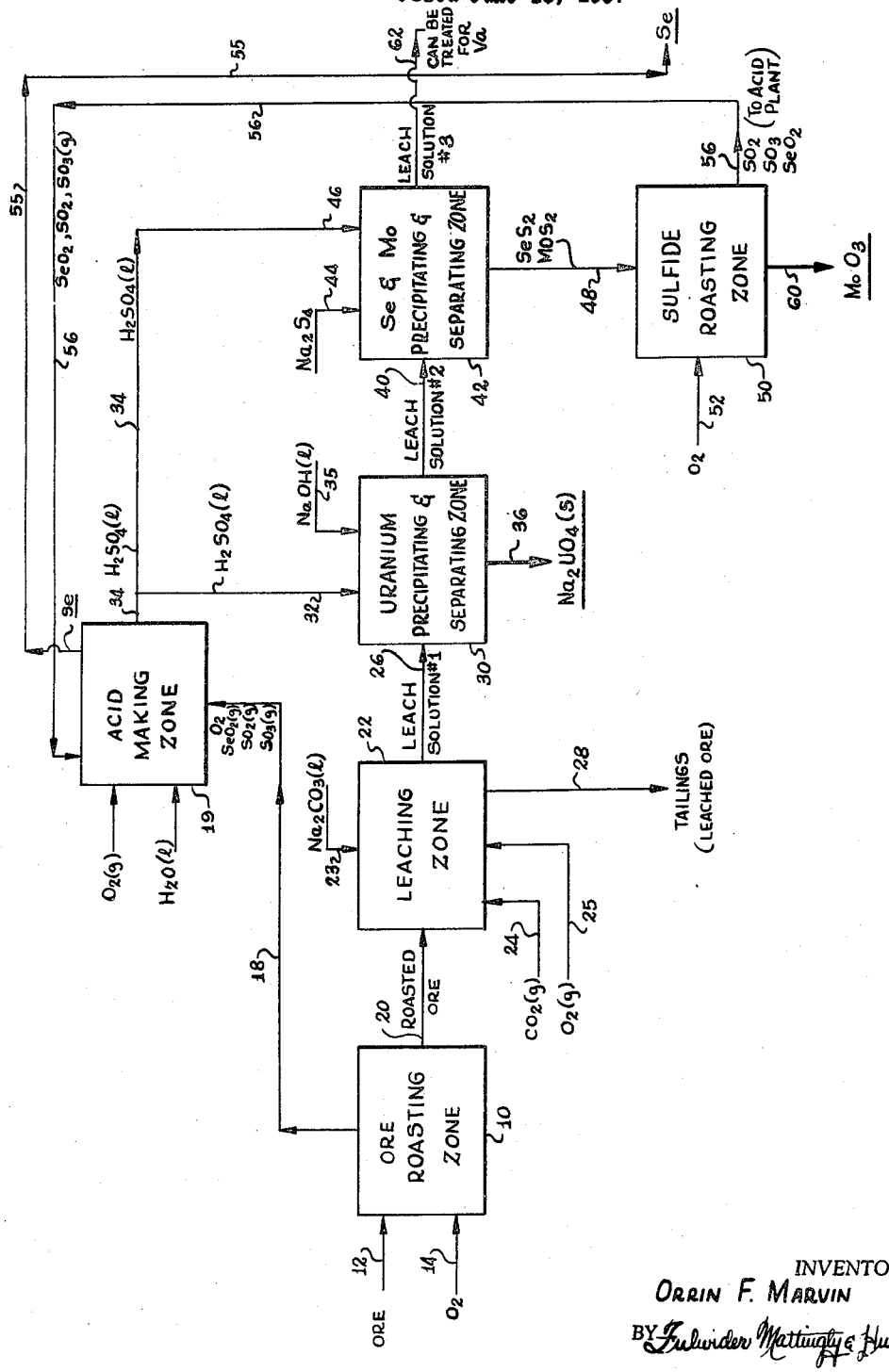

2,949,339

METHOD FOR THE RECOVERY OF URANIUM, SELENIUM AND MOLYBDENUM

Orrin F. Marvin, Cottonwood, Ariz., assignor to A. E. Butterfield, Tucson, Ariz., and A. K. Swann, Evansville, Ind.

Filed June 18, 1957, Ser. No. 666,431

15 Claims. (Cl. 23—14.5)

This invention relates generally to the recovery of uranium, selenium and molybdenum from a composite ore containing these elements, and relates specifically to the recovery of these elements from low-grade ore deposits containing small percentages of carnotite, molybdenum and selenium sulphides, and possibly uranium sulphides, complex oxides such as molybdates, selenites and selenates, these ore deposits being characterized in that they have a high "lime equivalence."

In the past, ores of the type described have been treated mainly for their uranium content, although selenium and molybdenum are also of value if their processing cost can be reduced sufficiently. In extracting uranium, dilute acid leaches and alkaline leaches have been used extensively, both of which are, however, not wholly satisfactory.

In treating ores having a high "lime equivalent" (that is, an ore which has a large amount of mineral acid-consuming compounds such as calcium carbonate, or magnesium carbonate) by sulphuric acid or any other mineral acid, for the purpose of leaching the uranium, a great amount of the mineral acid employed will necessarily be consumed by the lime equivalent. Thus, if the ore has a fifty percent lime equivalent, approximately one-half ton of acid per ton of ore will be consumed prior to the leaching of the uranium portion of the ore. Because of the aforementioned acid consumption, mineral acid leaches are exceedingly costly.

Dilute leaching of these ores also entails the solution of many other constituents, such as iron and copper, etc., which materially hinder the recovery of uranium in the precipitation zone.

Composite ores of the type described are more successfully leached under pressure with a solution of alkali carbonate, to thereby dissolve the uranium portion as a uranyl carbonate. The uranyl carbonate is then precipitated from the solution by any appropriate method, as, for example, by the addition of sodium hydroxide to form the insoluble metauranate. However, such processes are not wholly satisfactory because they do not result in substantially complete recovery of the uranium present in the composite ore. Lack of complete uranium recovery appears to be due to the fact that the leaching operation itself is not completely successful. Further, if uranium is present in the form of sulphide, the carbonate leach will be wholly unsuccessful. The lack of complete recovery is perhaps possibly due to other factors as yet not definitely known, such as, for example, due to a peculiar combination of the uranium portion of the ore with the other values present.

In addition to known chemical methods for concentration and recovery of the uranium portion of the composite ore, physical methods have also been attempted, such methods being mainly based upon a principle of different rates of gravitational settling of the different values within the ore. However, the rate of gravitational settling of the main constituents of the ore values is approximately the same, and any concentration or separation of the values by such methods is generally unsuccessful.

Moreover, as mentioned, none of the above methods for recovery of uranium takes into account the molybdenum and selenium values that are present in the composite ore, either as sulphides or water insoluble molybdates, selenites or selenates. The dilute acid leach treatment described above, for example, does not dissolve to any substantial degree the molybdenum or selenium sulphides, or the water insoluble molybdates, selenites, or selenates, or selenides, such as, for example, $Cu_2Se$, $PbSe$ and $HgSe$, that are present in the ore. Further, the carbonate treatment, above described, or modifications thereof, does not dissolve the molybdenum or selenium sulphides from the ore. Thus, the bulk of the molybdenum and selenium values are lost in the tailings, unless some further costly recovery steps are provided.

Bearing in mind the foregoing facts, it is a major object of the present invention to provide an improved method for the extraction of uranium from composite ores of the type described wherein substantially complete recovery of the uranium values in the ore is obtained.

It is another object of the present invention to provide a method for substantially complete recovery of uranium from an ore of the type described wherein an improved leaching step is provided.

It is still another object of the present invention to provide a simple and inexpensive method for the substantially complete recovery of uranium from composite ores of the type described which includes the steps of first roasting the ore and subjecting the roasted ore to an improved high-temperature leaching step whereby the uranium is substantially completely leached from the roasted ore.

Yet a further object of the present invention is to provide a method for the extraction of uranium, molybdenum and selenium values from a composite ore which includes carnotite, sulphides, water-insoluble molybdates, selenites, selenates, molybdenum and selenium sulphides, and other compounds of high lime equivalence, said method achieving substantially complete recovery of the uranium, selenium and molybdenum values present in said ore.

It is yet another object of the present invention to provide a method for the recovery of uranium, molybdenum and selenium values from composite ores of the type above described which includes the steps of preliminarily roasting the ore, subjecting the roasted ore to an improved high-temperature leaching step, and subsequently precipitating each of the molybdenum, selenium and uranium values present within the ore.

Still a further object of the present invention is to provide a process for the substantially complete recovery of selenium and molybdenum from ores of the type described which includes the steps of roasting the ore, subjecting the roasted ore to a high-temperature leaching step, precipitating selenium and molybdenum from the leach solution, and separating selenium and molybdenum values by a second roasting step.

Still a further object of the present invention is to provide a process for the substantially complete recovery of uranium, selenium and molybdenum in a simple and relatively inexpensive manner.

These and other objects of the present invention will become more clearly understood by referring to the following description, and to the accompanying figure in which the flow sheet represents one preferred form of the process of my invention.

In general, the main steps of the process are listed below:

(1) Roasting of the ore within specified temperature ranges, thereby volatilizing at least part of the selenium values and causing other conversions within the ore, to be described hereafter in detail.

(2) Leaching the roasted ore with a sodium carbonate solution through which hot carbon dioxide and oxygen gases are passed to form a first leach solution having dissolved therein substantially all the uranium values as uranyl carbonate, the molybdenum values as sodium molybdate, and the selenium values as sodium selenites and selenate.

(3) Precipitating the uranium values from the first leach solution in the form of sodium metauranate, the remaining solution being designated as the second leach solution.

(4) Precipitating the selenium and molybdenum values from the second leach solution, as selenium and molybdenum sulphide.

(5) Roasting the selenium and molybdenum sulphide precipitate to completely volatilize the selenium values as selenium (but not volatilize the molybdenum), the molybdenum sulphide being oxidized to molybdenum trioxide, the selenium values from this step and from the first step are of a C.P. grade, and are generally sold directly in this form. The molybdenum trioxide and the sodium metauranate products of the process are sold directly in this form.

Referring now to the above main steps and subsidiary steps of the process in detail, the composite ore of the type described enters the ore-roasting zone 10 along the line 12. The composite ore comprises the following compounds in the following proportions:

| Element or Compound | Amount, percent |
| --- | --- |
| Silicon | About 55-60 |
| Magnesium carbonate, ferric oxide, or ferrous oxide | About 20 |
| Calcium carbonate | About 16 |
| Sodium, potassium sulphates and chlorides (water-soluble) | About 1-3 |
| Uranium as carnotite ($K_2O \cdot 2UO_3 \cdot V_2O_5 \cdot H_2O$) and possibly sulphide, $US_2$, $US_3$ and other uranium minerals | 0.3-1 |
| Selenium as lead selenite or lead selenate and selenium sulphide ($SeS_2$); as selenides | 0.25-1 |
| Molybdenum as lead molybdate and molybdenum sulphide ($MoS_2$) | 0.2-1 |
| Strontium, manganese, and gallium present in either the oxide or the sulphide form | 0.1-0.2 |
| Copper, lead, titanium, zirconium, carbon, boron, and thallium | Traces |

It will be understood that the above amounts are merely an average and are not definitive limits. For example, the uranium content (measured as carnotite) may be as high in some cases as 10% and as low in some cases as 0.01%.

The ore is sent to the ore-roasting zone 10 in a finely divided state along with an oxygen-containing gas such as air or oxygen itself, which enters the ore-roasting zone along the line 14. The ore-roasting zone is maintained at a temperature of above 400° centigrade, and below 800° C. and preferably is maintained at approximately 550° C.

Generally speaking, the roasting step renders the values completely soluble by the subsequent leaching step—while the bulk of the remaining possible interfering constituents remain insoluble. Specifically, within the range of temperatures above mentioned, oxidation of any uranium, below a +6 valence state, to a +6 valence state is obtained, as well as oxidation of iron, manganese, and some of the trace elements. The sulphides are converted to the oxides with the exception of selenium sulphide which partially decomposes within these temperatures to form selenium dioxide vapor. It will be seen that if the ores have been oxidized by nature, a roasting step may not be necessary.

The extent of selenium volatilization during roasting depends upon the other constituents in the ore. I have found that when sufficient oxides or carbonates of elements such as Pb, Cu, etc., are present, none of the selenium is volatilized. These compounds combine with selenium dioxide forming selenites.

The other decomposed sulphides combine with oxygen to form sulphur dioxide and sulphur trioxide gases whereupon the calcium and magnesium carbonates are converted in part to their sulphates, respectively, by reaction with $SO_2$ and $SO_3$ gases in the roasting zone. The bulk of the sulphur dioxide and sulphur trioxide, as well as the selenium vapors formed in roasting zone 10 pass therefrom via line 18 to an acid-making zone 19. The sulphur dioxide sent to the acid-making zone 19 is further oxidized to the trioxide, and water is added, in a conventional manner to make sulphuric acid. Any selenium dioxide which does volatilize is sent to the zone 19 and is immediately precipitated in the sulphuric acid as selenium, according to the equation: $SeO_2 + 2SO_2 = Se + SO_3$. The selenium thus produced is of a chemically pure grade.

The sulphuric acid produced in the acid-making zone 19 is employed in subsequent steps of the process, as will be described, and is preferably used at a 10-50% concentration.

The roasted ore is taken from the roasting zone 10 along line 20 to the leaching zone 22 where the ore is leached with an alkali carbonate solution, for example, sodium carbonate, through which hot carbon dioxide and oxygen gases are passed. The leaching solution is maintained preferably at or near its boiling point, at which temperature its leaching effect upon the roasted ore is most effective.

The carbon dioxide and oxygen gases enter the sodium carbonate solution above the boiling point of water in order to maintain the carbonate solution at its boiling point. The entry temperature of the gas is preferably maintained at approximately 120-150° C. in order to obtain quantitative results. It may be desirable, in some instances, to maintain the carbonate-carbon dioxide-oxygen system under pressure during the leaching step.

The rate of carbon dioxide-oxygen gas addition varies with the concentration and amount of carbonate solution employed. However, the amount of gases required for total recovery generally varies between 0.003 and 0.2 pound $CO_2$ and between 0.55-1.75 pounds $O_2$ per pound of uranium oxide $U_3O_8$. It will be noted that even minor amounts of $CO_2$ and $O_2$ are highly effective in the leaching operation.

The concentration of the sodium carbonate in the solution varies between wide limits. There is as consumption of the alkali carbonate in the leaching step due to the presence of some calcium sulphate and the like formed during the roasting step. The amount of such carbonate-consuming reagents varies a substantial amount and no precise figure of concentration can be given. However, the concentration of the sodium carbonate generally lies between 2-10% and can be readily adjusted depending upon the amount of calcium sulphate present.

It has been found that if the leaching solution contains only hot alkali carbonte, the recovery of the values during the leaching step is substantially lower—of the order of 70%, as compared with a 95 to 99+% recovery obtained by my above-described leaching operation in which hot gases are passed through the solution.

As a result of the above leaching step, the following components of the ore go into solution and form leach solution No. 1:

Uranium as sodium uranyl carbonate
Selenium as sodium selenite and sodium selenate
Molybdenum as sodium molybdate
Sodium and potassium sulphates, chlorides, carbonates and borates and any other water-soluble salts
Thallium as thallous carbonate
Sodium vanadate The leached ore or the tailings, as opposed to leach solution No. 1, leave the leaching zone 22 along the line 28 and comprise the following: Silicon; aluminum, iron, manganese, copper, lead, in the form of their oxides; and copper, lead, calcium, magnesium, strontium, gallium and thallium in the form of their carbonates. From a consideration of leach solution No. 1 and the tailings, it will thus be seen that leach solution No. 1 contains all the desired values of the original ore.

Leach solution No. 1 is sent from the zone 22 along line 26 and into zone 30 where the precipitation of the uranium values from the selenium, molybdenum and other compounds in the solution occurs. Leach solution No. 1 is slightly basic or alkaline because of the addition of carbonate solution, the carbonate being decomposed and neutralized by the addition of sulphuric acid to zone 30 from line 32. The sulphuric acid from line 32 is preferably obtained from the acid-making zone 19 and passes into line 32 from line 34. The neutralized leach solution is then made alkaline by the addition of concentrated sodium hydroxide entering along line 35 whereupon uranyl compound precipitates in the form of sodium metauranate without the precipitation of molybdenum, selenium or any of the other compounds. Concentrated sodium hydroxide rather than a more dilute solution is used to thereby restrict the addition of water into the system.

The sodium metauranate slurry is then sent to a thickener for further concentration, or otherwise separated, as by a filter press, indicated generally by the designation "separating zone" in box 30, and removed therefrom along line 36. The sodium metauranate produced can then be sent directly to appropriate refineries for further treatment to produce the element uranium.

After the precipitation of the sodium metauranate from leach solution No. 1, the resulting solution, which is designated as leach solution No. 2, passes from the zone 30, via the line 40, to the next precipitating and separating zone 42 where selenium and molybdenum are jointly precipitated in the form of their sulphides. The sulphide is added to leach solution No. 2 along the line 44 in the form of sodium tetrasulphide $Na_2S_4$, the amount added being slightly above or equal to the quantitative amount necessary to completely combine with the selenium and molybdenum present.

No precipitation of the selenium and molybdenum sulphides takes place until the solution is acidified and to this end, sulphuric acid is added to zone 42 from line 46. This sulphuric acid is made in the acid-making zone 19 and enters the line 46 from line 34.

It should be noted that any vanadium present (which will be in the form of sodium vanadate) will not precipitate as the sulphide, since the sulphides of vanadium are soluble in acid solution. Thus, a clean separation of the selenium and molybdenum from any vanadium values is obtained. It should be noted also that a substantially complete or quantitative recovery of the selenium and molybdenum values is possible by means of the above sulphide precipitation.

The precipitated selenium and molybdenum sulphides are separated from leach solution No. 2 by appropriate means and sent along the line 48 into the sulphide roasting zone 50. The sulphides are roasted in zone 50, in the presence of an oxygen-containing gas entering along the line 52.

The temperature of the sulphide roasting zone is preferably maintained at approximately 550° C. At this temperature the selenium sulphide will decompose and form selenium dioxide and volatilize in that form without any possibility of simultaneous molybdenum volatilization. Furthermore, at a temperature of about 550° C. the conversion of molybdenum sulphide to molybdenum trioxide occurs. Below 550° C. the intermediate oxides of molybdenum are formed which are not commercially as valuable at the present time.

If intermediate oxides are desired, it is entirely possible to conduct the roasting of the sulphides at temperatures substantially below 550° C., for example, at a temperature as low as 320° C. However, at temperatures below 320° C., no substantial volatilization of selenium dioxide occurs. The upper limits of temperature in the roasting zone is 800° C., since at this temperature molybdenum will volatilize.

Thus, in summary, when the sulphide roasting is conducted at temperatures of about 500° C., selenium sulphide is decomposed into selenium dioxide vapor and sulphur dioxide, the sulphur dioxide in turn being oxidized partially to sulphur trioxide. The selenium dioxide vapors leave the roasting zone 60 along line 56 and combine with the remainder of the selenium dioxide precipitated as selenium from the acid-making zone 19, as previously described. The total selenium thus precipitated from the zone 19 enters the line 55 and is sold as a C.P. grade. The sulphur dioxide and trioxide leave the roasting zone 50 along the line 56 to be sent to the acid-making zone 19, for use in making sulphuric acid.

The molybdenum sulphide is oxidized to molybdenum trioxide and leaves the roasting zone along line 60, as a solid, and is generally sold directly in this form.

The leach solution leaving the zone 42 along the line 62 can be recycled to the leaching zone 22, if, for some reason, the recovery of uranium is below a predetermined amount—e.g. 95%.

The leach solution in line 62 also contains vanadium values and alkali salts. The vanadium values can be readily separated from this solution by appropriate means, such as, for example, by addition of sulphuric acid and boiling the resulting solution over an extended period of time, e.g. 12 hours, to precipitate the vanadium.

It can be seen from the foregoing description that a method for recovering the entire uranium values from a composite ore has been provided which is both simple and inexpensive. It can further be seen that in addition to the complete recovery of uranium values, the complete recovery of selenium, molybdenum, and vanadium values has also been provided by a simple and inexpensive method.

Attention is also drawn to the fact that the sulphuric acid required for the precipitation steps may be, in great measure, provided by each of the roasting operations above described, that is, in the initial ore-roasting zone 10, and in the sulphide roasting zone 50, the exact proportion of sulphuric acid produced depending upon the sulphide content of the ore. In some instances, it has been found that 100% of the acid requirements of the process have been met by acid produced from the sulphides of the ore.

In recovering selenium and molybdenum alone, without regard to recovery of uranium, similar roasting and leaching steps to those previously described, are found advantageous. The uranium precipitating step is however entirely omitted in such recoveries, the roasted ores moving from the leaching zone 22 directly to zone 42 for the selenium and molybdenum precipitation. The amounts of $CO_2$ and $O_2$ gases employed during the leaching step is still dictated by the uranium content of the ore.

Examples of the process for the recovery of uranium, selenium and molybdenum values in one process are set forth below:

Example 1

The assay of the ore falls within the percentages enumerated hitherto, except that the values have the following exact percentages:

|  | Percent |
|---|---|
| $U_3O_8$ | 0.36 |
| Se | 0.18 |
| Mo | 0.83 |

One ton of ground ore, of 30-mesh size or smaller, is introduced into the ore-roasting zone 10 along line 12, and is burned in air at a temperature of approximately 550° C. The roasted ore is leached in zone 22 with 210 gallons of 3.25% $Na_2CO_3$ solution maintained at 100° C., through which is passed 0.04 cu. ft. $CO_2$/min. and 2.8 cu. ft. $O_2$/min., each of the gases being maintained at a temperature of 120° C. and atmospheric pressure. The leaching operation extends over a thirty-minute period.

To the leach solution is first added 19.5 lbs. of 40% sulphuric acid (entering via line 32 and subsequently 2.1 lbs. of 50% sodium hydroxide (entering via line 35), The resulting uranium precipitate in zone 30, measured as $U_3O_8$, assays 7.08 lbs. or 95+% of the theoretical maximum obtainable.

Sodium tetrasulphide, in the amount of 37.4 lbs., is added along line 44 to the remaining leach solution (leach solution No. 2) which enters zone 42 and 16.5 lbs. of 40% sulphuric acid is then added from line 46 to thereby precipitate selenium and molybdenum. The resulting selenium-molybdenum precipitate is sent to the roasting zone 50 to be roasted at 550° C.

Selenium is produced, leaving zone 50 along line 54, as a vapor. Some selenium is also volatilized during the ore roast in zone 10, and the resulting selenium is combined with the selenium in line 54. The total selenium thus produced is 3.45 lbs. or 97+% of the maximum available.

The total molybdenum recovered is 16.49 lbs. or 99+% of the total available, and leaves the zone 50, via line 60, as molybdenum trioxide.

*Example II*

0.25 ton ore, assaying 0.052% $U_3O_8$, 0.0405% Se, and 0.41% Mo is treated as follows:

(1) Roast at 550° C. in zone 10.

(2) Treat the roasted ore in zone 22 with 53 gal. of 2½% $Na_2CO_3$ solution at 100° C., while bubbling $CO_2$ and $O_2$ gas (at 120° C. and atmospheric pressure) at rates of 0.005 cu. ft./min. and 0.18 cu. ft./min., respectively during a 30 minute leaching period.

(3) Add to the leach solution No. 1 entering zone 30 first, 4.63 lbs. of 10% $H_2SO_4$ and second, 0.55 lb. of 50% NaOH. The resulting uranium precipitate leaves zone 30 via line 36 and weighs 0.251 lb. or the equivalent of a 99+% recovery.

(4) To leach solution No. 2 entering zone 42 is first added 4.07 lbs. of sodium tetrasulphide and then 8.81 lbs. of 10% $H_2SO_4$ is added from lines 44 and 46, respectively. The resulting sulphide precipitate is sent to zone 50 via line 48.

(5) In zone 50, roasting takes place at 550° C., the resulting products selenium dioxide and molybdenum trioxide leaving the zone along lines 56 and 60 respectively. The total amount of selenium recovered from line 55 to 98+% or 0.2 lb. The total amount of molybdenum recovered is 97+% or 2.0 lbs.

While several preferred embodiments of my invention have been shown and described herein in some detail, it will readily be seen that substantial modifications and changes may be made that lie within the scope of my invention. For this reason, I do not wish to be limited by the embodiments herein shown and described, but only by the appended claims.

I claim:

1. A process for the recovery of uranium, selenium and molybdenum values from composite ores including uranium oxides, molybdenum and selenium sulphides, water-insoluble molybdates, selenates, selenides, and selenites, which comprises: roasting said ore in the presence of an oxidizing gas at a temperature of between 400° and 800° C.; leaching the roasted ore with a hot aqueous alkali metal carbonate solution containing carbon dioxide and oxygen gases to form a first leach solution and tailings; selectively precipitating the uranium values from said first leach solution, the remaining solution including selenium and molybdenum values; jointly precipitating the selenium and molybdenum values from said remaining leach solution; and roasting said selenium and molybdenum precipitates at a temperature sufficiently high to decompose said selenium precipitate and to volatilize the selenium for subsequent recovery, said temperature being below that necessary to volatilize the molybdenum from its molybdenum precipitate to thereby separate the selenium values from the molybdenum values.

2. The process as defined in claim 1 characterized in that the amount of carbon dioxide in said leaching solution is between 0.003 and 0.2 pound per pound of uranium oxide, and the amount of oxygen is between 0.55 and 1.75 pounds per pound of uranium oxide.

3. The process of claim 1 characterized in that sulphur dioxide, sulphur trioxide, and selenium gases are formed in said first ore-roasting step; and further characterized in that in said leaching step, substantially all the uranium, selenium and molybdenum values are leached out from the ore as the carbonate, selenite and selenate, and molybdate, respectively, of the alkali metal employed.

4. A process of claim 1 characterized in that after the separation of the selenium and molybdenum precipitate from its leach solution, the remaining solution is treated for recovery of vanadium values, substantially the entire vanadium values in said ore being present as a soluble vanadate in said remaining leach solution.

5. The process of claim 1 characterized in that said uranium values are selectively precipitated as a metauranate and said selenium and molybdenum values are jointly precipitated as the sulphides thereof.

6. The process of claim 1 wherein said ore is roasted at a temperature of approximately 550° C., the partially decompose the sulphides of selenium and thereby volatilize selenium, said selenium volatilized in said ore-roasting step and said selenium volatilized from said selenium and molybdenum roasting step accounting for substantially the entire amount of selenium present in the ore.

7. A process for the recovery of uranium, selenium and molybdenum from composite ores containing molybdenum and selenium sulphides, uranium oxides, water-insoluble molybdates, selenites, selenates, selenides and compounds having a high lime equivalent, which comprises: roasting the composite ore in the presence of an oxidizing gas at a temperature of approximately 550° C. to thereby decompose the sulphides, forming sulphur dioxide, sulphur trioxide, and selenium gases, and forming oxygen compounds in the ore; forming sulphuric acid from the sulphur dioxide and trioxide gases formed in the ore-roasting step; precipitating the selenium volatilized during said roasting step in said sulphuric acid; leaching the roasted ore with an alkali metal carbonate solution containing carbon dioxide and oxygen gases, said solution being maintained substantially at its boilng point to thereby dissolve substantially all the uranium selenium and molybdenum values as the carbonate, selenite and selenate, and molybdate, respectively of the alkali metal employed to produce a first leach solution; separating said first leach solution from the leached ore; selectively precipitating the uranium values from said first leach solution by neutralizing said solution with sulphuric acid made from said sulphur dioxide and trioxide; adding sodium hydroxide to prevent the precipitation of molybdenum values from said first leach solution; separating the uranium from said first leach solution in the form of sodium metauranate, the second solution thus formed including selenium and molybdenum values in the form of selenites, selenates and molybdates; precipitating the selenium and molybdenum values from said second leach solution as a sulphide, said second leach solution being made acid; separating the selenium and molybdenum sulphide precipitates from said second leach solution; roasting said selenium and molybdenum sulphides at a temperature of approximately 550° C. to thereby decompose the selenium precipitate and volatilize the selenium in its chemically pure state, said temperature being below the temperature at which the molybdenum sulphide decomposes, to thereby separate the selenium values from said molybdenum values, said molybdenum sulphide being converted to the trioxide, said roasting step causing formation of sulphur dioxide and sulphur trioxide; and forming sulphuric acid from said sulphur dioxide and trioxide for use in precipitation of the uranium, selenium and molybdenum values, as aforementioned.

8. A process for recovering selenium and molybdenum from composite ores, which comprises: preliminarily roasting said composite ore at a first temperature sufficient to partially volatilize the selenium present but below that sufficient to volatilize the molybdenum, said temperature being sufficiently high to oxidize the remainder of selenium and molybdenum values in said composite ores to selenites, selenates and molybdates; leaching the selenite, selenate, and molybdate values with an aqueous solution of an alkali metal carbonate to form water-soluble alkali metal selenites, selenates and molybdates; precipitating said alkali metal selenites, selenates and molybdates as sulphides in acid solution; and roasting said selenium sulfides and molybdenum sulphides at a temperature of between 200° C. and 800° C. to thereby substantially entirely decompose selenium sulphide and volatilize selenium, the selenium in the preliminary roasting steps and in said sulphide roasting step accounting for the total selenium values in said ore, said roasting step being of sufficiently high temperature to oxidize molybdenum to a molybdenum oxide.

9. The process of claim 8 wherein sulphur dioxide and sulphur trioxide are formed in said preliminary roasting step and said sulphide roasting step, forming sulphuric acid from said sulphur dioxide and sulphur trioxide, said sulphuric acid being employed in the precipitation of sodium selenite, selenate and molybdate as the sulphides thereof.

10. The process of claim 8 wherein both said preliminary roasting temperatures and said sulphide roasting temperatures are maintained at approximately 550° C.

11. A process for the recovery of uranium, selenium and molybdenum values from composite ores including uranium oxides, molybdenum and selenium sulphides, water-insoluble molybdates, selenates, selenides, and selenites, which comprises: leaching the ore with a hot aqueous alkali metal carbonate solution containing carbon dioxide and oxygen gases to form a first leach solution and tailings; selectively precipitating the uranium values from said first leach solution, the remaining solution including selenium and molybdenum values; jointly precipitating the selenium and molybdenum values from said remaining leach solution; and roasting said selenium and molybdenum precipitates at a temperature sufficiently high to decompose said selenium precipitate and to volatilize the selenium for subsequent recovery, said temperature being below that necessary to volatilize the molybdenum from its molybdenum precipitate to thereby separate the selenium values from the molybdenum values.

12. The process as defined in claim 11 characterized in that the amount of carbon dioxide in said leaching solution is between 0.003 and 0.2 pound per pound of uranium oxide, and the amount of oxygen is between 0.55 and 1.75 pounds per pound of uranium oxide.

13. The process of claim 11 characterized in that said uranium values are selectively precipitated as a metauranate and said selenium and molybdenum values are jointly precipitated as the sulphides thereof.

14. A process for the recovery of uranium, selenium and molybdenum from composite ores containing molybdenum and selenium sulphides, uranium oxides water-insoluble molybdates, selenites, selenates, selenides and compounds having a high lime equivalent, which comprises: leaching the ore with an alkali metal carbonate solution containing carbon dioxide and oxygen gases, said solution being maintained substantially at its boiling point to thereby dissolve substantially all the uranium, selenium and molybdenum values as the carbonate, selenite and selenate, and molybdate, respectively of the alkali metal employed to produce a first leach solution; separating said first leach solution from the leached ore; selectively precipitating the uranium values from said first leach solution by neutralizing said solution with sulphuric acid made from said sulphur dioxide and trioxide; adding sodium hydroxide to prevent the precipitation of molybdenum values from said first leach solution; separating the uranium from said first leach solution in the form of sodium metauranate, the second solution thus formed including selenium and molybdenum values in the form of selenites, selenates and molybdates; precipitating the selenium and molybdenum values from said second leach solution as a sulphide, said second leach solution being made acid; separating the selenium and molybdenum sulphite precipitates from said second leach solution; roasting said selenium and molybdenum sulphides at a temperature of approximately 550° C. to thereby decompose the selenium precipitate and volatilize the selenium in its chemically pure state, said temperature being below the temperature at which the molybdenum sulphide decomposes, to thereby separate the selenium values from said molybdenum values, said molybdenum sulphide being converted to the trioxide, said roasting step causing formation of sulphur dioxide and sulphur trioxide; and forming sulphuric acid from said sulphur dioxide and trioxide for use in precipitation of the uranium, selenium and molybdenum values, as aforementioned.

15. The process of claim 8 wherein the alkali metal carbonate leach solution contains hot $CO_2$ and $O_2$ gases.

References Cited in the file of this patent

UNITED STATES PATENTS

| 1,403,477 | Becket et al. | Jan. 17, 1922 |
| 1,730,681 | Ogden et al. | Oct. 8, 1929 |
| 1,915,703 | Towne | June 27, 1933 |
| 2,096,846 | Donahue et al. | Oct. 26, 1937 |
| 2,096,847 | Donahue et al. | Oct. 26, 1937 |
| 2,339,888 | Smith | Jan. 25, 1944 |

OTHER REFERENCES

Mellor: "Comprehensive Treatise on Inorganic and Theoretical Chemistry" (1932), Longmans, Green & Co., London, vol. 10, pages 693, 694, 697, 698, 702, 810, 916–919 (1930); vol. 11, pages 492–494 (1931).

Atomic Energy Commission Document ACCO-48, June 18, 1954, pages 14–23 (declassified September 23, 1955).

UNITED STATES PATENT OFFICE

CERTIFICATE OF CORRECTION

Patent No. 2,949,339                      August 16, 1960

Orrin F. Marvin

It is hereby certified that error appears in the printed specification of the above numbered patent requiring correction and that the said Letters Patent should read as corrected below.

Column 8, line 31, for "the" read -- to --; column 9, line 25, for "steps" read -- step --; column 10, line 29, for "sulphite" read -- sulphide --.

Signed and sealed this 4th day of April 1961.

(SEAL)
Attest:    ERNEST W. SWIDER

ARTHUR W. CROCKER
Acting Commissioner of Patents